(12) United States Patent
Mallik et al.

(10) Patent No.: US 11,855,527 B1
(45) Date of Patent: Dec. 26, 2023

(54) THREE-PHASE POWER FACTOR CONTROLLER IMPLEMENTED WITH SINGLE-PHASE POWER FACTOR CORRECTION CONTROLLER

(71) Applicant: STMicroelectronics International N.V., Geneva (CH)

(72) Inventors: Ranajay Mallik, Ghaziabad (IN); Akshat Jain, Nahan (IN)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 17/834,174

(22) Filed: Jun. 7, 2022

(51) Int. Cl.
*H02M 1/42* (2007.01)
*H02M 1/12* (2006.01)
*H02M 7/217* (2006.01)

(52) U.S. Cl.
CPC ........... *H02M 1/4216* (2013.01); *H02M 1/12* (2013.01); *H02M 1/4225* (2013.01); *H02M 1/4233* (2013.01); *H02M 7/2173* (2013.01); *H02M 7/2176* (2013.01); *H02M 1/42* (2013.01); *H02M 7/217* (2013.01)

(58) Field of Classification Search
CPC ........ H02M 1/12; H02M 1/42; H02M 1/4216; H02M 1/4225; H02M 1/4233; H02M 7/217; H02M 7/2173; H02M 7/2176
See application file for complete search history.

(56) References Cited

U.S. PATENT DOCUMENTS

| | | | |
|---|---|---|---|
| 5,631,550 A | 5/1997 | Castro et al. | |
| 7,391,630 B2 * | 6/2008 | Acatrinei | G05F 1/70 363/89 |
| 2002/0149953 A1 | 10/2002 | Smedley et al. | |
| 2004/0119448 A1 | 6/2004 | Wiegand et al. | |
| 2013/0194838 A1 | 8/2013 | Jang et al. | |
| 2015/0048805 A1 * | 2/2015 | Lin | H02P 9/48 322/28 |

FOREIGN PATENT DOCUMENTS

CN 209267442 U 8/2019

OTHER PUBLICATIONS

Li, Guangdi, et al: An Interleaved Three-Phase PWM Single-Stage Resonant Recitifer With High-Frequency Isolation, 2019, IEEE, 10 pgs.

(Continued)

*Primary Examiner* — Gary L Laxton
(74) *Attorney, Agent, or Firm* — CROWE & DUNLEVY (57) ABSTRACT

A PFC correction circuit includes first, second, and third phase inputs coupled to three-phase power mains, with a three-phase full-wave rectifying bridge connected to an input node. First, second, and third boost inductors are respectively connected between first, second, and third phase inputs and first, second, and third taps of the three-phase full-wave rectifying bridge. A boost switch is connected between the input node and ground, and a boost diode is connected between the input node and an output node. A multiplier input driver generates a single-phase input signal as a replica of a signal at the three-phase power mains after rectification. A single-phase power factor controller generates a PWM signal from the single-phase input signal. A gate driver generates a gate drive signal from the PWM signal. The boost switch is operated by the gate drive signal.

9 Claims, 4 Drawing Sheets

(56) References Cited

OTHER PUBLICATIONS

Bayhan, Sertac, et al: Design and Implementation of DSP-Based Three-Phase PFC, IEEE, 2011.
Design Guide: TIDM-1000, Vienna Rectifier-Based, Three-Phase Power Factor Correction (PFC) Reference Design Using C2000(tm) MCU, Revised Apr. 2020, 69 pgs.

* cited by examiner

THREE-PHASE POWER FACTOR CONTROLLER IMPLEMENTED WITH SINGLE-PHASE POWER FACTOR CORRECTION CONTROLLER

TECHNICAL FIELD

This disclosure is related to the field of power factor correction (PFC) circuits, and in particular, to a three-phase PFC circuit that utilizes a single-phase PFC controller.

BACKGROUND 3-phase electric vehicle (EV) charging and electric-driven industrial applications are often governed by the International Electrotechnical Commission (IEC) standard IEC61000-3-12, which provides for limitations on harmonic currents injected into public electric mains. IEC61000-3-12, in particular, provides for limits on electrical and electronic equipment with a rated input current exceeding 16 A per phase current.

In order to comply with this standard, such equipment typically utilizes a power factor correction circuitry (PFC) typically based on the known Vienna, Swiss, or 6-Switch topologies. However, PFC circuits utilizing such topologies require high end PFC controllers, resulting in complex, expensive implementations. While the performance achieved from such designs is acceptable, further development is needed in order to provide for a less costly, simpler PFC circuit that can handle 3-phase power in high-power systems.

SUMMARY

Disclosed herein is a power factor correction circuit including first, second, and third phase inputs coupled to three-phase power mains, with a three-phase full-wave rectifying bridge connected to an input node. A first boost inductor is connected between a first phase input and a first tap of the three-phase full-wave rectifying bridge, a second boost inductor is connected between a second phase input and a second tap of the three-phase full-wave rectifying bridge, and a third boost inductor is connected between a third phase input and a third tap of the three-phase full-wave rectifying bridge. A boost switch is connected between the input node and ground. A boost diode is connected between the input node and an output node. A multiplier input driver is configured to generate a single-phase input signal as a replica of a sixth harmonic of a signal at the three-phase power mains. A single-phase power factor controller is configured to generate a PWM signal from the single-phase input signal. A gate driver is configured to generate a gate drive signal from the PWM signal, and the boost switch is operated by the gate drive signal.

The multiplier input driver may include a rectifier configured to generate a rectified voltage from the signal at the three-phase power mains, a voltage divider configured to generate a divided voltage from the rectified voltage, and a filter configured to filter the divided voltage to produce the single-phase input signal.

The multiplier input driver may instead include a rectifier configured to generate a rectified voltage from the signal at the three-phase power mains, an AC coupling circuit configured to pass AC components of the rectified voltage as an AC coupled signal, and a high pass filter configured to filter the AC coupled signal to produce the single-phase input signal.

The multiplier input driver may include a phase detection and synchronization circuit configured to detect zero crosses of a signal at the first phase input and generates an interrupt based thereupon, and a microcontroller configured to generate thesingle-phase input signal by using a Digital to Analog Controller (DAC) peripheral. Here the microcontroller continuously updates the input value to the DAC, the input value corresponding to a digital value from which the the analog voltage is generated.

As an alternative, the multiplier input driver may include a phase detection and synchronization circuit configured to detect zero crosses of a signal at the first phase input and generate an interrupt based thereupon, a processor configured to generate a pulse width modulation signal having a duty based upon an elapsed time between the generated interrupts, and a filter configured to filter the pulse width modulation signal to produce the single-phase input signal.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown but is to be accorded the widest scope consistent with the principles and features disclosed or suggested herein. Do note that in the below description, any described resistor or resistance is a discrete device unless the contrary is stated and is not simply an electrical lead between two points. Thus, any described resistor or resistance coupled between two points has a greater resistance than a lead between those two points would have, and such resistor or resistance cannot be interpreted to be a lead. Similarly, any described capacitor or capacitance is a discrete device unless the contrary is stated and is not a parasitic unless the contrary is stated. Moreover, any described inductor or inductance is a discrete device unless the contrary is stated and is not a parasitic unless the contrary is stated.

Figure 1:
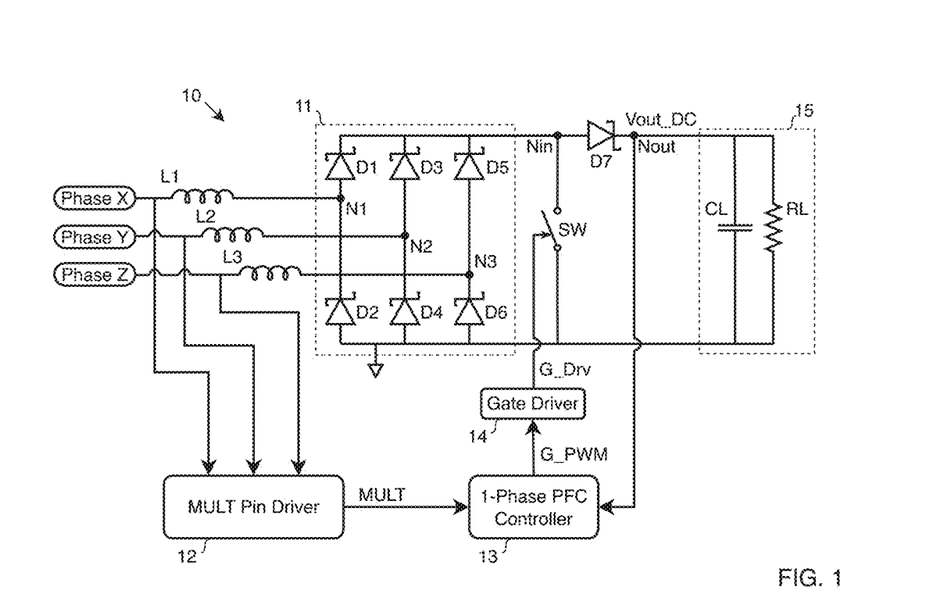
FIG. 1 is a schematic block diagram of a first embodiment of a power factor correction (PFC) circuit disclosed herein.

Now described with initial reference to FIG. 1 is a power factor correction (PFC) circuit 10 connected between three-phase power mains and a load 15 such as an electric vehicle (EV) charging station. The PFC circuit 10 includes a first boost inductor L1 connected between a first phase input (illustrated as Phase X) and a first node N1, a second boost inductor L2 connected between a second phase input (illustrated as Phase Y) and a second node N2, and a third boost inductor L3 connected between a third phase input (illustrated as Phase Z) and a third node N3.

The PFC circuit 10 includes a three-phase full-bridge rectifier 11 connected between an input node Nin and ground. The PFC circuit 10 includes a silicon-carbide (SiC) diode D1 having its cathode connected to the input node Nin and its anode connected to node N1, a SiC diode D2 having its cathode connected to node N1 and its anode connected to ground, a SiC diode D3 having its cathode connected to the input node Nin and its anode connected to node N2, a SiC diode D4 having its cathode connected to node N2 and its anode connected to ground, a SiC diode D5 having its cathode connected to the input node Nin and its anode connected to node N3, and a SiC diode D6 having its cathode connected to node N3 and its anode connected to ground. The SiC diodes D1-D6 may be fast recovery diodes.

A boost switch SW (which may be multiple power transistors connected in parallel) is connected between node Nin and ground, and is controlled by a gate drive signal G_Drv. A SiC diode D7 operating as a boost diode has its anode connected to the input node Nin and its cathode connected to an output node Nout. Notice that the load 15 is represented as a load capacitance CL and a load resistance RL connected in parallel between the output node Nout and ground.

A single-phase PFC controller 13 (for example, an STMicroelectronics L4984 PFC controller) has a multiplier input that receives a single-phase input signal MULT and a feedback input receiving the output voltage Vout_DC produced at the output node Nout of the PFC circuit 10 during operation, and generates a gate driver PWM signal G_PWM based thereupon. The gate driver PWM signal G_PWM serves to cause the gate driver 14 to generate the gate drive signal G_Drv which operates the switch SW to thereby cause the PFC circuit 10 to perform power factor correction to yield a high power factor for the combination of the PFC circuit 10 and load 15 seen by the mains, with a low total harmonic distortion (THD).

As is understood by those of ordinary skill in the art, in a three-phase full-wave rectifying bridge, the ripple frequency in the output voltage is at twice the frequency of the input mains voltage. Therefore, if a PFC controller designed for a single-phase input mains voltage is fed with a three-phase input mains voltage at its single multiplier input, the ripple frequency in the output voltage would be at six times the frequency of the input mains voltage.

To address this and enable a simple single-phase PFC controller 13 to be used with the three-phase PFC circuit 10, a multiplier pin driver 12 generates the single-phase input signal MULT as a replica of the 3-phase input voltage. Each inductor current (currents through L1, L2, L3) has an envelope of 50 Hz and is in phase with the input voltage. The single-phase input signal MULT is generated by extracting the ripple waveform resulting from the input mains signal being passed through a full bridge and then removing the DC component thereof. The gate driver PWM signal G_PWM is generated so that the inductor current envelope follows the input mains voltage, yielding a high power factor while keeping THD low.

Figure 2:
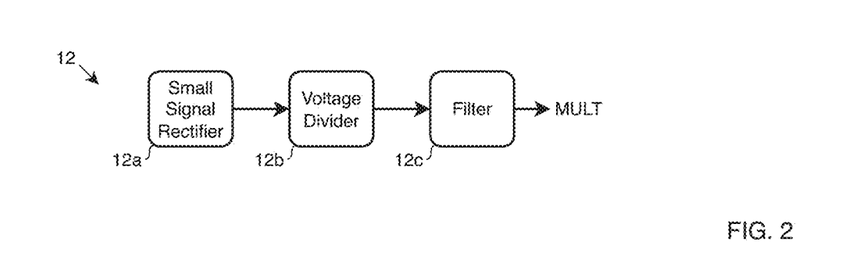
FIG. 2 is a block diagram of a first embodiment of the multiplier pin driver of FIG. 1.

A first sample multiplier pin driver 12 is shown in FIG. 2 and includes a small signal rectifier 12a that rectifies the input mains signal to yield a signal that is at six times the frequency of the input mains signal, a voltage divider 12b on the output of the small signal rectifier to reduce the resulting voltage to be within the linear operating range of the single-phase PFC controller 13, and a filter 12c that rejects noise and spurs to produce the single-phase input signal MULT for the multiplier input of the single-phase PFC controller 13.

Figure 8:
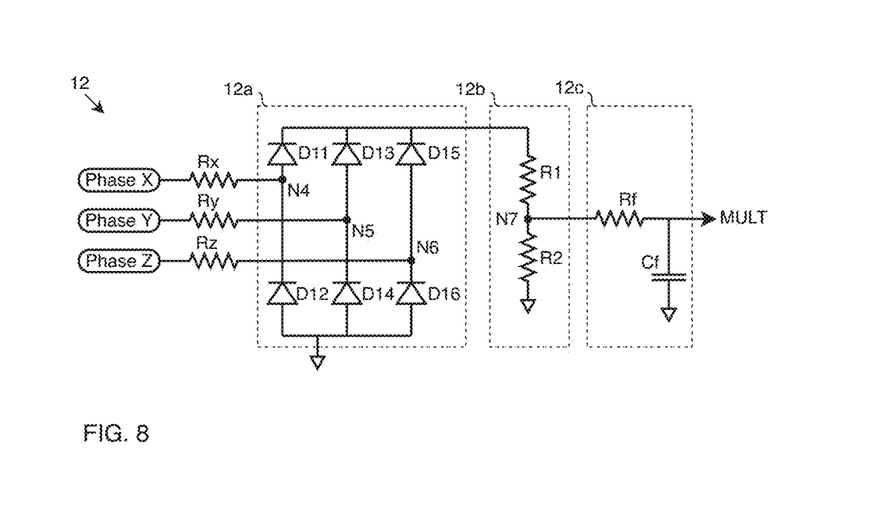
FIG. 8 is a detailed schematic diagram of the multiplier pin driver of FIG. 2.

Further details of this first sample multiplier pin driver 12 may be found in FIG. 8. The first multiplier pin driver 12 includes an additional bridge rectifier 12a coupled between the phase inputs of the input mains signal and a voltage divider 12b. In particular, a first phase resistance Rx is connected between the first phase input (illustrated as Phase X) and node N4, a second phase resistance Ry is connected between the second phase input (illustrated as Phase Y) and node N5, and a third phase resistance Rz is connected between the third phase input (illustrated as Phase Z) and node N6. The bridge rectifier 12a includes diode D11 having its cathode connected to resistor R1 and its anode connected to node N4, diode D12 having its cathode connected to node N4 and its anode connected to ground, diode D13 having its cathode connected to resistor R1 and it anode connected to node N5, diode D14 having its cathode connected to node N5 and its anode connected to ground, diode D15 having its cathode connected to resistor R1 and its anode connected to node N6, and diode D16 having its cathode connected to node N6 and its anode connected to ground.

The voltage divider 12b includes resistor R1 connected between the cathodes of diodes D11, D13, and D15 and node N7, and resistor R2 connected between node N7 and ground. At node N7, the result of the rectification is a DC level with a 300 Hz level AC signal riding on it. A filter 12c includes a filter resistor Rf connected between node N7 and the output of the first multiplier pin driver 12, and filter capacitor Cf connected between the output of the first multiplier pin driver 12 and ground. The single-phase input signal MOLT is produced at the output of the first multiplier pin driver 12.

Figure 3:
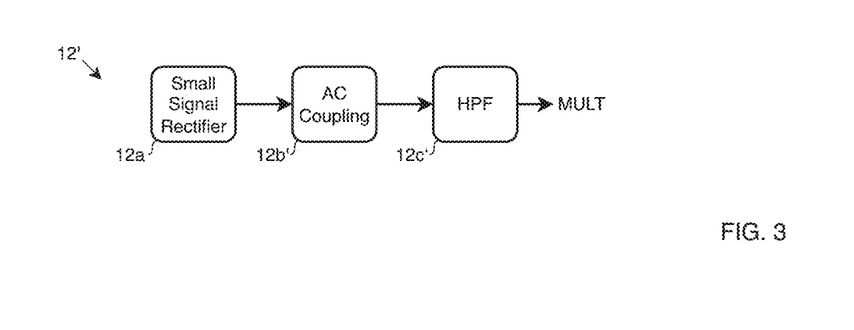
FIG. 3 is a block diagram of a second embodiment of the multiplier pin driver of FIG. 1.

A second sample multiplier pin driver 12' is shown in FIG. 3 and includes a small signal rectifier 12a that rectifies the input mains signal to yield a signal that is at six times the frequency of the input mains signal. An AC coupling circuit 12b' AC couples the AC portion of the output of the small signal rectifier 12a to a high pass filter 12c' while blocking the DC portion of the output of the small signal rectifier 12a, and a high pass filter 12c' passes the high frequency components, yielding the single-phase input signal MULT for the multiplier input of the single-phase PFC controller 13.

Figure 9:
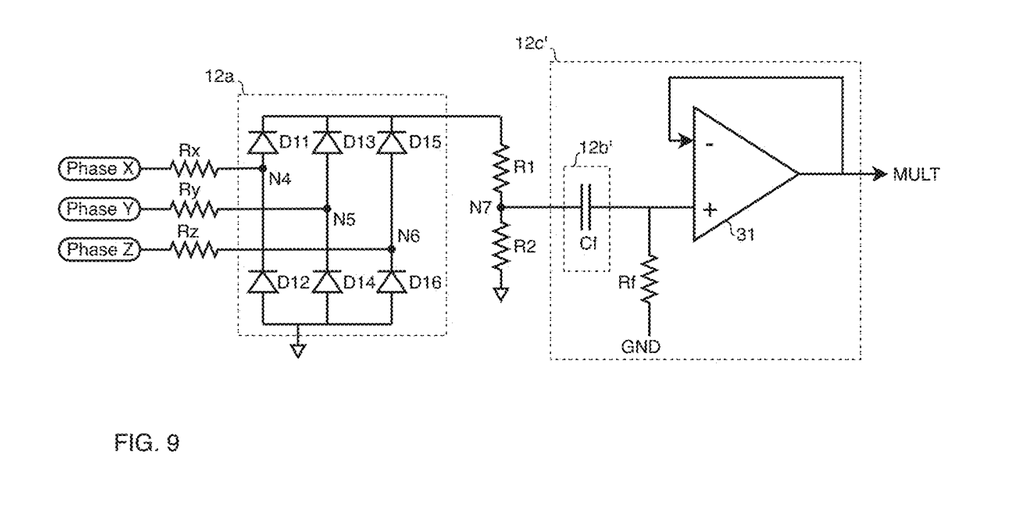
FIG. 9 is a detailed schematic diagram of the multiplier pin driver of FIG. 3.

Further details of this second sample multiplier pin driver 12' may be found in FIG. 9. The sample multiplier pin driver 12' includes an additional bridge rectifier 12a as described above with reference to FIG. 8. The additional bridge rectifier 12a is connected between the phase resistances Rx, Ry, Rz and a voltage divider formed by resistors R1 and R2. The AC coupling circuit 12b' is a capacitor Cf coupled between node N7 and a non-inverting input of an amplifier 31. The high pass filter 12c' includes the amplifier 31 with the capacitor Cf connected to its non-inverting input, as described, as well as a resistor Rf connected between the non-inverting input of the amplifier 31 and ground. The inverting input of the amplifier 31 is coupled to the output of the amplifier 31 to receive feedback therefrom. The single-phase input signal MULT is produced at the output of the second multiplier pin driver 12'.

Figure 4:
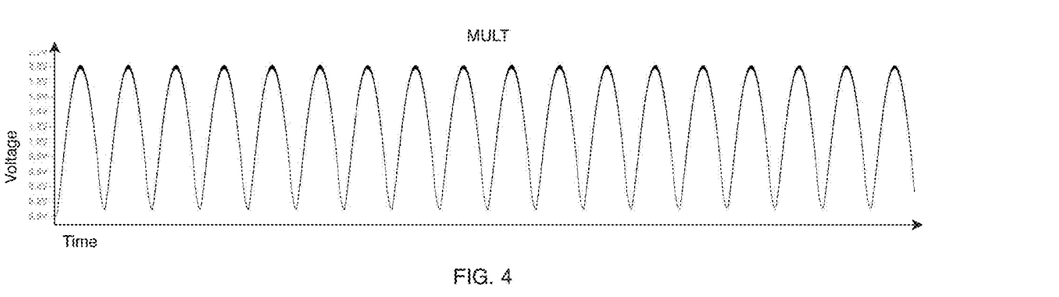
FIG. 4 is a graph of the single-phase input signal generated by the multiplier pin driver of FIG. 1.

A sample of the resulting single-phase input signal MULT may be observed in FIG. 4. In this example, the input signal MULT is a 300 Hz signal because the three-phase input mains 50 Hz signal is passed through a three phase bridge rectifier.

The above two sample multiplier pin drivers 12 and 12' are useful when expected power levels are low and switching noise is relatively manageable. However, where expected power levels are high, switching noise may be unmanageable, and therefore an alternative design may be desired for such situations.

Figure 5A:
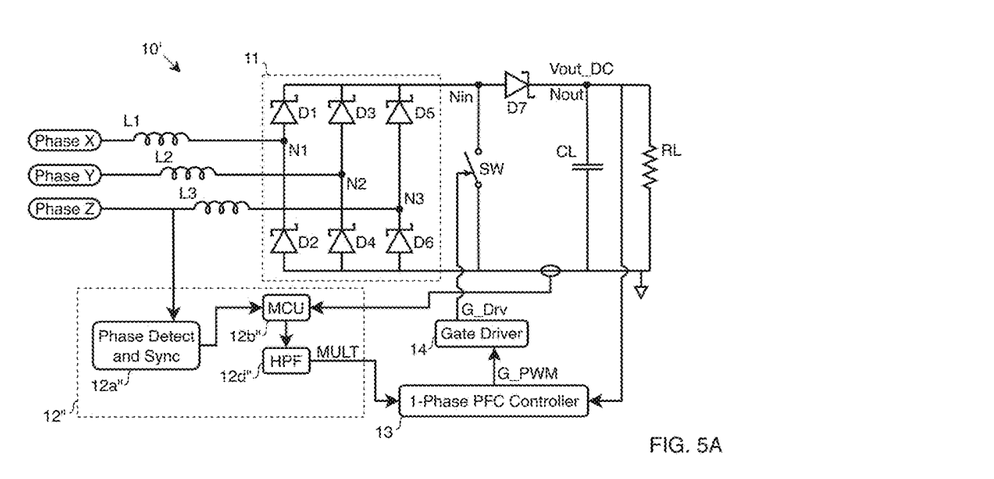
FIG. 5A is a schematic block diagram of a second embodiment of a power factor correction (PFC) circuit disclosed herein in which a high-pass filter is utilized in the generation of the single-phase input signal.

Now described with reference to FIG. 5A is another embodiment of the PFC circuit 10'. Here, the multiplier pin driver 12" includes a phase detection and synchronization circuit 12a" that is connected to one phase of the input mains signal (here, as an example, Phase Z) and detects zero crosses of that phase of the input mains signal. At each detected zero crossing, the phase detection and synchronization circuit 12a" generates an interrupt that is read by a microcontroller (or microprocessor) 12b". Based on the received interrupts (for example, in synchronization therewith), the microcontroller 12b" generates a PWM output signal with a fixed frequency. In particular, the elapsed time between interrupts sets the duty cycle of the PWM output signal.

A filter 12d" filters the PWM output signal, yielding the single-phase input signal MULT for the multiplier input of the single-phase PFC controller 13. The single-phase PFC controller 13 operates as described above to cause the gate driver 14 to generate a gate drive signal G_Drv that operates the switch SW to thereby cause the PFC circuit 10 to perform power factor correction to yield a high power factor for the combination of the PFC circuit 10 and load 15 seen by the mains, with a low total harmonic distortion (THD).

Figure 5B:
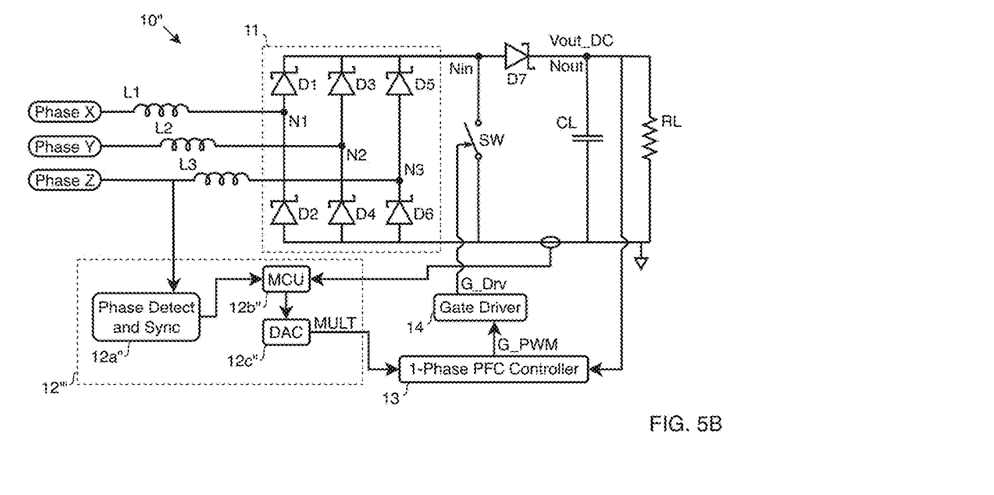
FIG. 5B is a schematic block diagram of the second embodiment of a power factor correction (PFC) circuit disclosed herein, but in this example, a digital to analog converter is utilized in the generation of the single-phase input signal.

With additional reference to FIG. 5B, the MCU 12b" directly generates the signal by using the Digital to Analog Controller (DAC) 12c" peripheral. Here the MCU 12b" continuously updates the input value to DAC 12c", the input value corresponding to a digital value from which the analog voltage is generated. The analog voltage produced by the DAC 12c" may serves as the single-phase input signal MULT for the multiplier input of the single-phase PFC controller 13.

Figure 6:
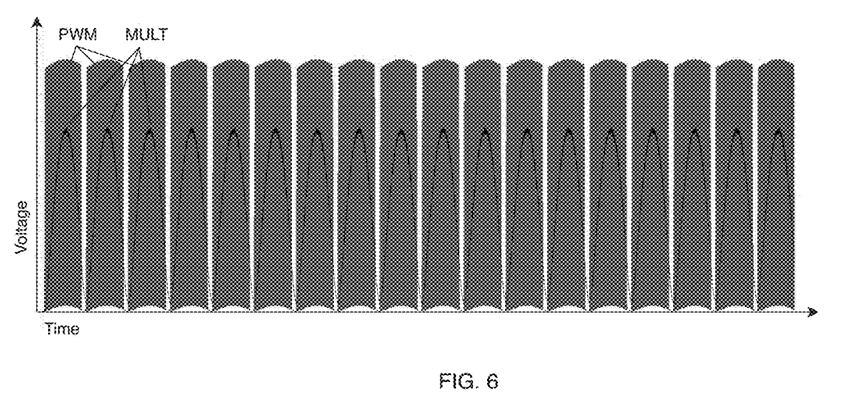
FIG. 6 is a graph of the single-phase input signal generated by the multiplier pin driver of FIG. 5 superimposed over the PWM signal generated by the microcontroller of FIG. 5.
Figure 7:
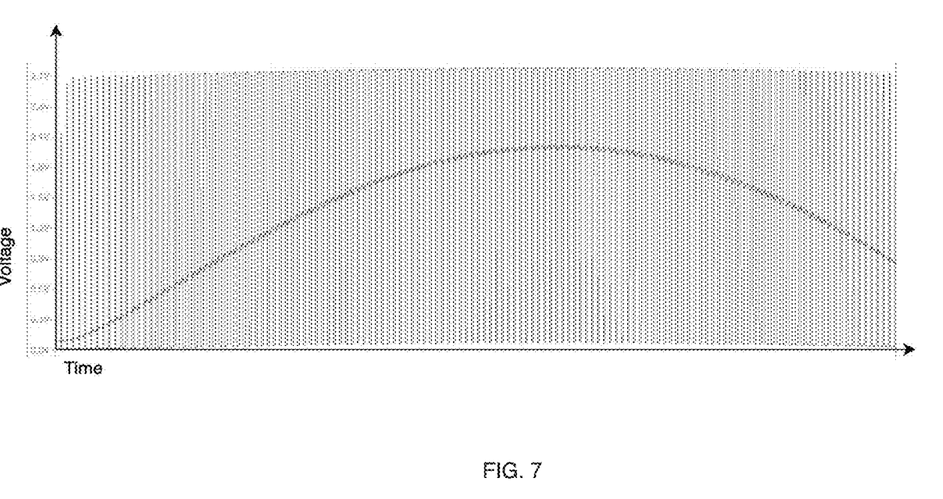
FIG. 7 is a greatly enlarged view of the graph of FIG. 6.

A sample of the resulting PWM output signal generated by the microcontroller 12b" may be observed in FIG. 6 superimposed over the single-phase input signal MULT for the multiplier input of the single-phase PFC controller 13 as output by the filter 12d". A greatly enlarged view of the PWM output signal and the single-phase input signal MULT can be observed in FIG. 7.

The PFC circuits 10 and 10' described herein provide a robust, reliable, simple to adopt approach to complying with regulations regarding power factor and THD that does not utilize costly and complex prior art topologies.

It is clear that modifications and variations may be made to what has been described and illustrated herein, without thereby departing from the scope of this disclosure, as defined in the annexed claims.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A power factor correction circuit, comprising:
first, second, and third phase inputs coupled to three-phase power mains;
a three-phase full-wave rectifying bridge connected to an input node;
a first boost inductor connected between a first phase input and a first tap of the three-phase full-wave rectifying bridge;
a second boost inductor connected between a second phase input and a second tap of the three-phase full-wave rectifying bridge;
a third boost inductor connected between a third phase input and a third tap of the three-phase full-wave rectifying bridge;
a boost switch connected between the input node and ground;
a boost diode connected between the input node and an output node;
a multiplier input driver configured to generate a single-phase input signal as a replica of rectified three-phase power mains, wherein the multiplier input driver comprises:
a phase detection and synchronization circuit configured to detect zero crosses of a signal at the first phase input and generate interrupts based thereupon; and
a processor receiving the interrupts and configured to generate, in cooperation with a digital to analog converter, the single-phase input signal by continuously updating an input to the digital to analog converter;
a single-phase power factor controller configured to generate a PWM signal from the single-phase input signal; and
a gate driver configured to generate a gate drive signal from the PWM signal;
wherein the boost switch is operated by the gate drive signal.

2. A power factor correction circuit, comprising:
first, second, and third phase inputs coupled to three-phase power mains;
a three-phase full-wave rectifying bridge connected to an input node;
a first boost inductor connected between a first phase input and a first tap of the three-phase full-wave rectifying bridge;
a second boost inductor connected between a second phase input and a second tap of the three-phase full-wave rectifying bridge;
a third boost inductor connected between a third phase input and a third tap of the three-phase full-wave rectifying bridge;
a boost switch connected between the input node and ground;
a boost diode connected between the input node and an output node;
a multiplier input driver configured to generate a single-phase input signal as a replica of rectified three-phase power mains, wherein the multiplier input driver comprises:
a phase detection and synchronization circuit configured to detect zero crosses of a signal at the first phase input and generate interrupts based thereupon;

a processor configured to generate a pulse width modulation signal having a duty cycle set by an elapsed time between the generated interrupts; and a filter configured to filter the pulse width modulation signal to produce the single-phase input signal;

a single-phase power factor controller configured to generate a PWM signal from the single-phase input signal; and a gate driver configured to generate a gate drive signal from the PWM signal;

wherein the boost switch is operated by the gate drive signal.

3. A method of correcting power factor, comprising:

receiving a three-phase input mains power signal at inputs to three respective boost inductors;

applying a first full wave rectification to outputs of the three boost inductors to yield a rectified signal at an input node;

generating a single-phase multiplier signal as a replica of the rectified three-phase input mains power signal, wherein generating the single-phase multiplier signal comprises:

detecting zero crosses of a signal at an input to one of the three boost inductors and generating interrupts based thereupon; and continuously updating inputs to a digital to analog converter based upon the interrupts to thereby generate the single-phase multiplier signal;

applying the single-phase multiplier signal at a multiplier input of a power-factor correction controller, and generating a gate drive signal using the power-factor correction controller based thereupon;

selectively actuating a boost switch connected between the input node and ground, in response to the gate drive signal; and applying an output voltage generated at a cathode of a boost diode coupled to the input node to a load.

4. A method of correcting power factor, comprising:

receiving a three-phase input mains power signal at inputs to three respective boost inductors;

applying a first full wave rectification to outputs of the three boost inductors to yield a rectified signal at an input node;

generating a single-phase multiplier signal as a replica of the rectified three-phase input mains power signal, wherein generating the single-phase multiplier signal comprises:

detecting zero crosses of a signal at an input to one of the three boost inductors and generate interrupts based thereupon;

generating a digital pulse width modulation signal having a duty cycle set by an elapsed time between the generated interrupts; and filtering the digital pulse width modulation signal to produce the single-phase multiplier signal applying the single-phase multiplier signal at a multiplier input of a power-factor correction controller, and generating a gate drive signal using the power-factor correction controller based thereupon;

selectively actuating a boost switch connected between the input node and ground, in response to the gate drive signal; and applying an output voltage generated at a cathode of a boost diode coupled to the input node to a load.

5. A method of correcting power factor, comprising:

receiving a three-phase input mains power signal at inputs to three respective boost inductors;

applying a first full wave rectification to outputs of the three boost inductors to yield a rectified signal at an input node;

generating a single-phase multiplier signal as a replica of the rectified three-phase input mains power signal, wherein generating the single-phase multiplier signal comprises:

applying a second full wave rectification to the three-phase input mains power signal to yield a ripple signal at a frequency equal to six times a frequency of the three-phase input mains power signal; and filtering the ripple signal to produce a single-phase multiplier signal;

applying the single-phase multiplier signal at a multiplier input of a power-factor correction controller, and generating a gate drive signal using the power-factor correction controller based thereupon;

selectively actuating a boost switch connected between the input node and ground, in response to the gate drive signal; and applying an output voltage generated at a cathode of a boost diode coupled to the input node to a load.

6. The method of claim 5, further comprising dividing the ripple signal prior to filtering the ripple signal.

7. The method of claim 6, wherein filtering the ripple signal comprises passing the ripple signal through a high pass filter.

8. A power factor correction circuit, comprising:

phase inputs coupled to multi-phase power mains;

a full-wave rectifying bridge having an output connected to an input node;

a separate boost inductor for each phase connected between the phase inputs and inputs of the full-wave rectifying bridge;

a boost switch connected between the input node and ground;

a boost diode connected between the input node and an output node;

a multiplier input driver configured to generate a single-phase input signal as a replica of an input signal received from the multi-phase power mains, wherein the multiplier input driver comprises:

a phase detection and synchronization circuit configured to detect zero crosses of a signal at a first of the phase inputs and generate interrupts based thereupon; and a processor receiving the interrupts and being configured to, in cooperation with a digital to analog converter, generate the single-phase input signal by continuously updating an input to the digital to analog converter;

a single-phase power factor controller configured to generate a PWM signal from the single-phase input signal; and a gate driver configured to generate a gate drive signal from the PWM signal;

wherein the boost switch is operated by the gate drive signal.

9. A power factor correction circuit, comprising:

phase inputs coupled to multi-phase power mains;

a full-wave rectifying bridge having an output connected to an input node;

a separate boost inductor for each phase connected between the phase inputs and inputs of the full-wave rectifying bridge;

a boost switch connected between the input node and ground;

a boost diode connected between the input node and an output node;

a multiplier input driver configured to generate a single-phase input signal as a replica of an input signal received from the multi-phase power mains, wherein the multiplier input driver comprises:

a phase detection and synchronization circuit configured to detect zero crosses of a signal at a first of the phase inputs and generate interrupts based thereupon;

a processor configured to generate a pulse width modulation signal having a duty cycle set by an elapsed time between the generated interrupts; and a filter configured to filter the pulse width modulation signal to produce the single-phase input signal;

a single-phase power factor controller configured to generate a PWM signal from the single-phase input signal; and a gate driver configured to generate a gate drive signal from the PWM signal;

wherein the boost switch is operated by the gate drive signal.

* * * * *